No. 778,269. PATENTED DEC. 27, 1904.
A. F. RIETZEL.
PROCESS OF ELECTRIC WELDING.
APPLICATION FILED FEB. 6, 1904.
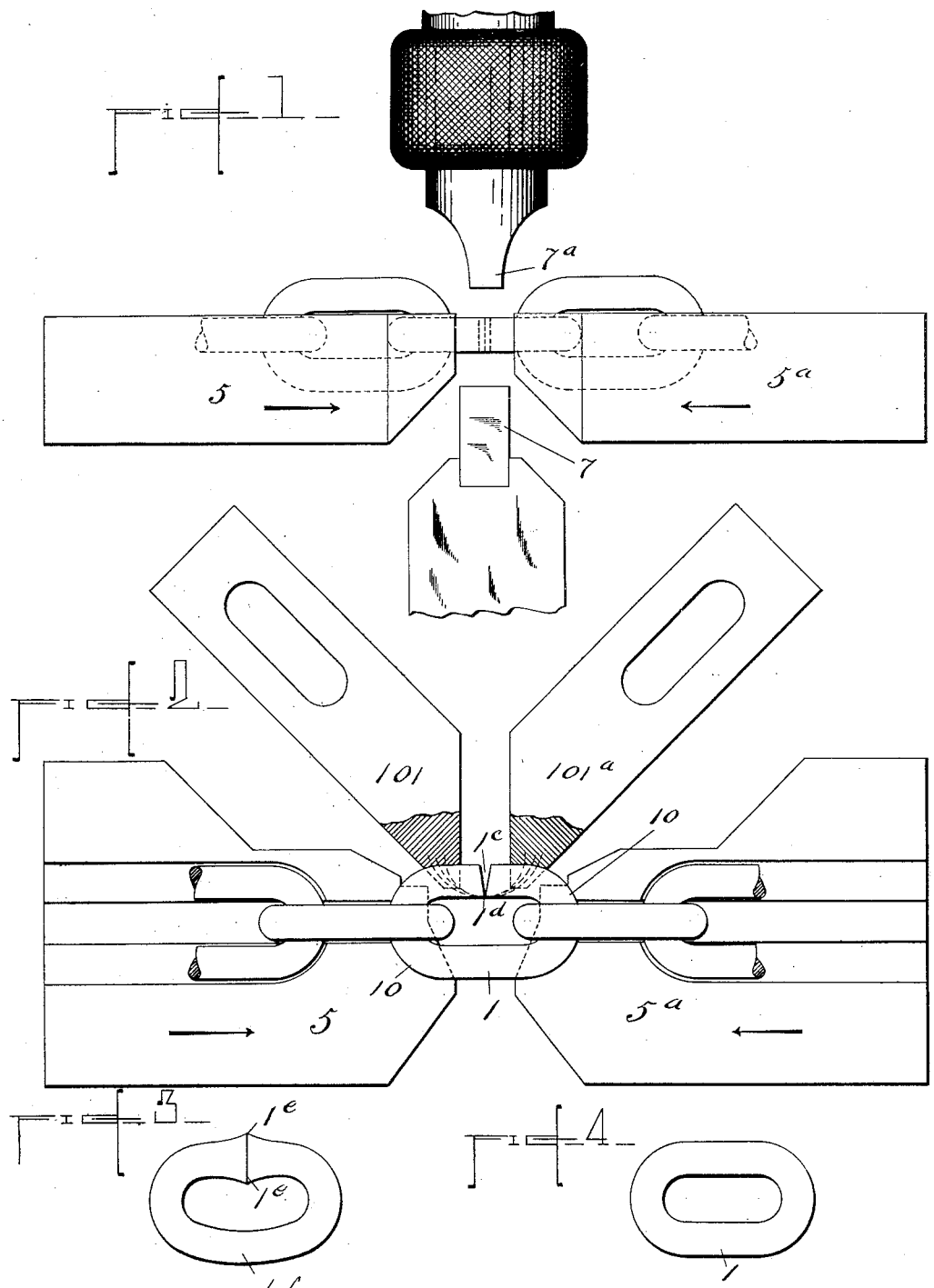
WITNESSES:
INVENTOR
Adolph F. Rietzel.
BY
Townsend & Decker
ATTORNEYS No. 778,269.

Patented December 27, 1904.

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

PROCESS OF ELECTRIC WELDING.

SPECIFICATION forming part of Letters Patent No. 778,269, dated December 27, 1904.

Original application filed October 15, 1903, Serial No. 177,140. Divided and this application filed February 6, 1904. Serial No. 192,314.

*To all whom it may concern:*

Be it known that I, ADOLPH F. RIETZEL, a citizen of the United States, and a resident of Lynn, in the county of Essex and State of Massachusetts, have invented certain new and useful Improvements in Processes of Electric Welding, of which the following is a specification.

My present invention relates to certain improved processes or methods of welding metal by the heating effect of electric currents combined with pressure, and is mainly intended to obviate certain difficulties and objections which arise when the heating-current is passed into the sections or parts to be welded at one side by means of electrodes applied thereto in a direction transverse to the line of the welding pressure.

A further object of my invention is to obviate certain difficulties which arise in the electric welding of rings, chain-links, and other endless forms wherein the weld is made at one side of the ring or link and by a welding pressure applied to the blank in such way as to tend to develop mechanical stresses or strains in the continuous or unwelded side thereof. When the heating-current is passed into the work by transversely-applied electrodes passing heating-currents into one side only of the section of metal to be welded and the surfaces to be welded abut throughout or at any but the points farthest from the electrodes, there is a tendency of the work to heat more at the portions nearest to the electrodes, and hence an inequality of heating results which tends to the production of an imperfect weld. The object of my present invention is to overcome this difficulty, to which end the invention consists in so forming the surfaces where the weld is to be produced that they shall abut initially at their edges or portions farthest removed from the portions where the welding-currents are conducted into them, the result of which is that when the current is applied and the pieces are subjected to pressure the heating will begin in those portions which would otherwise, as stated, tend to carry little current and be less heated, after which the heating spreads toward the electrodes as the pieces yield and come together. The result is a more uniform heating and a more homogeneous weld. This part of my invention is obviously applicable to the welding of metal pieces of any form.

Another part of my invention consists in an improved process of welding metal rings or links by applying pressure to effect the welding of one open side of the link, the other side remaining substantially cold, and in drawing out or reducing the welded side while the pressure is maintained to prevent the link or ring from opening by the strain or stress developed by such pressure and consequent flexure or bending in the cold side. This part of my invention is especially useful in the welding of links, rings, or other endless forms of large cross-section and in which it is necessary to apply considerable force in order to flex or bend the cold portion in order to bring the open ends together and weld them, so that internal stresses or strains of considerable amount are developed which would tend to weaken the welded link if it were employed without first drawing out or reducing the bur or upset of the weld and substantially restoring the welded side of the link to a length which will permit the opposite side to regain its original form.

In the accompanying drawings, Figure 1 illustrates the elementary portions of an apparatus in which my invention may be practiced. Fig. 2 is a plan of the apparatus. Fig. 3 is a plan of a chain-link after the weld has been made, but before the bur or upset has been drawn out or reduced. Fig. 4 shows the finished link.

Referring to the drawings, wherein I have shown my invention as practiced with chain-links, the work-holders or slides, which receive a link 1 between them, are of any suitable character to permit the application of pressure in the direction of one or both of the arrows, Fig. 2, for the purpose of effecting the weld. For convenience these slides or work-holders have proper shoulders, as indicated at 10, conforming to the shape of the link and adapted to permit the required pressure to be applied by a movement of the holders 5 5ª, one or both. Electrodes furnished with heating-current from any suitable source and adapted to be brought into contact with the side of the link are indicated at 101 101$^a$. The form or configuration of these electrodes may be infinitely varied without departing from the invention. Arranged in suitable position and of suitable form to permit the bur produced by the welding to be reduced or drawn out are an anvil 7 and a hammer or pressure-die 7$^a$. These may be formed of any desired shape on their work-surfaces and may be operated in any desired manner to compress or hammer the weld so as to reduce the bur or upset thereof. The meeting ends of the blank or the open side of the link are so formed, as shown in Fig. 2, that the ends touch (or by application of end pressure on the link may be made to touch) at their inner sides 1$^d$, while a small gap 1$^e$ remains between their other sides. In the drawings this gap is shown considerably exaggerated. In practice it need only be sufficient to prevent conductive contact between the ends at the outside. The work having been placed in the holding-dies, as shown, the ends of the blank where the weld is to be formed may be brought into conductive contact by suitable pressure applied through the holders, provided they do not already touch at the time the link is placed in position. The heating-current being then caused to flow will pass, as indicated by the broken lines, from one of the contacts or current-supplying electrodes to the other, the same having been placed in contact with the work, as shown, and a suitable alternating current or other current having been furnished from any suitable source, as well understood in the art. The current, as shown, passes through the link and the inner contact 1$^d$ of the contiguous ends. Meanwhile pressure is applied, and since the contact is the point of greatest resistance in the circuit the link at this point is rapidly heated by the current until it becomes soft and plastic, and finally the material yields and spreads under the longitudinal or end pressure to which the abutting surfaces are subjected. As the contact-surfaces thus yield and spread the welding pressure is applied and continued while the heat gradually but rapidly spreads toward the outer side of the juncture and a weld is finally produced involving the entire cross-section of the abutting or contiguous ends. The reason for this method of forming and heating the ends is that if the parts to be welded should initially abut through the entire opposing surfaces or at any part nearer the points of application of the current such parts will heat first, and the parts nearest the electrode cannot be sufficiently heated without concurrently heating the other parts to an excessive amount. This is due to the fact that when the abutting link ends touch throughout their entire adjacent surfaces the circuit of least resistance and inductance from one contact-electrode to the other is through the outer side of the abutting link ends and the outer side of their contact, which side is next the contact-electrodes. As a result the heating-current is concentrated in such outer side. This effect is even greater with the alternating current generally used in electric welding than with a direct current, since at high frequencies the inductive resistance or inductance adds greatly to the total impedance of the circuit through the inner side of the link. If the link to be welded is of iron, the displacement of heating-current and heating effect is rendered still greater by the greater inductance of the inside circuit through the magnetic medium and by the fact that the permeability or magnetic susceptibility of the outer side of the abutting link ends and their contacts is greatly reduced by their increase in temperature, thereby still further reducing the inductance of the outer side of the circuit. On the completion of the weld the link finally assumes the form shown in exaggerated degree in Fig. 3, the same being upset on the welded side at 1$^e$, while the opposite side of the link 1$^f$ is bent, which it is compelled to do in order to accommodate the contraction of the welded side under the end or welding pressure applied by the holder. It is obvious that this flexure or bending of the cold side of the link would develop a tension in the welded side which would open the juncture if the end pressure of the dies were relieved while the weld was still hot and soft. It is further obvious that if the link were allowed to cool and were used in this condition the internal stresses developed by the welding strain would still exist and would weaken the link. To obviate this, the end pressure is maintained by the holding-dies 5 5$^a$ or by other means, and the weld or bur 1$^e$ is reduced by the application of the hammering or pressure dies 7 7$^a$, at which time preferably, however, the current-conveying electrodes 101 and 101$^a$ are withdrawn from contact with the work. This hammering down or reducing of the bur in the metal, still hot and soft, draws off or reduces the upset and restores the welded side of the link to normal length and diameter, during which operation, of course, the end pressure applied by the holding-dies 5 5$^a$ is gradually relieved to accommodate the elongation of the welded side of the link and the restoration of the bended side to form, the resultant being the perfected form in which the bended side is straightened out, so as to eliminate the internal stress before referred to, and the welded side is reduced, so as to be smooth or destitute of pronounced projections.

My present application is a division of my application filed October 15, 1903, Serial No. 177,140.

What I claim as my invention is—

1. The herein-described improvement in welding links or other endless forms by an electric welding process applied to one side of the link, consisting in drawing out the welded side to remove the stress developed in the bended side by the pressure applied to effect the weld.

2. The herein-described improvement in manufacturing links or other endless forms by the electric welding process, consisting in abutting the ends of a piece of metal with their edges in contact at the inside of the link, conducting the heating-current into the work by the outside surface of the link and forming the weld by the end pressure exerted in the axial line of the stock, as and for the purpose described.

3. The herein-described improvement in electric welding, consisting in initially abutting the pieces to be welded at one edge, conducting heating-current into the pieces at the side thereof opposite the abutted edges and applying pressure to effect the weld.

4. The improvement in electric welding by current conducted into the work at one side thereof, consisting in initially abutting the pieces to be welded at their edges opposite the side into which the current is conducted.

5. The herein-described improvement in welding links or rings by the electric welding process, consisting in bringing the two ends of a piece of metal into abutment, applying end pressure to form the weld and hammering or condensing the joint while the pressure is maintained to prevent the link from opening by the stress developed in the opposite side through the deforming end pressure.

Signed at Lynn, in the county of Essex and State of Massachusetts, this 4th day of February, A. D. 1904.

ADOLPH F. RIETZEL.

Witnesses:
C. I. LINDSEY,
EDWIN W. HAWES.